Jan. 2, 1951 — M. SYRACUSA — 2,536,614
PROPELLER HANDLING MECHANISM
Filed Oct. 12, 1945 — 4 Sheets-Sheet 3
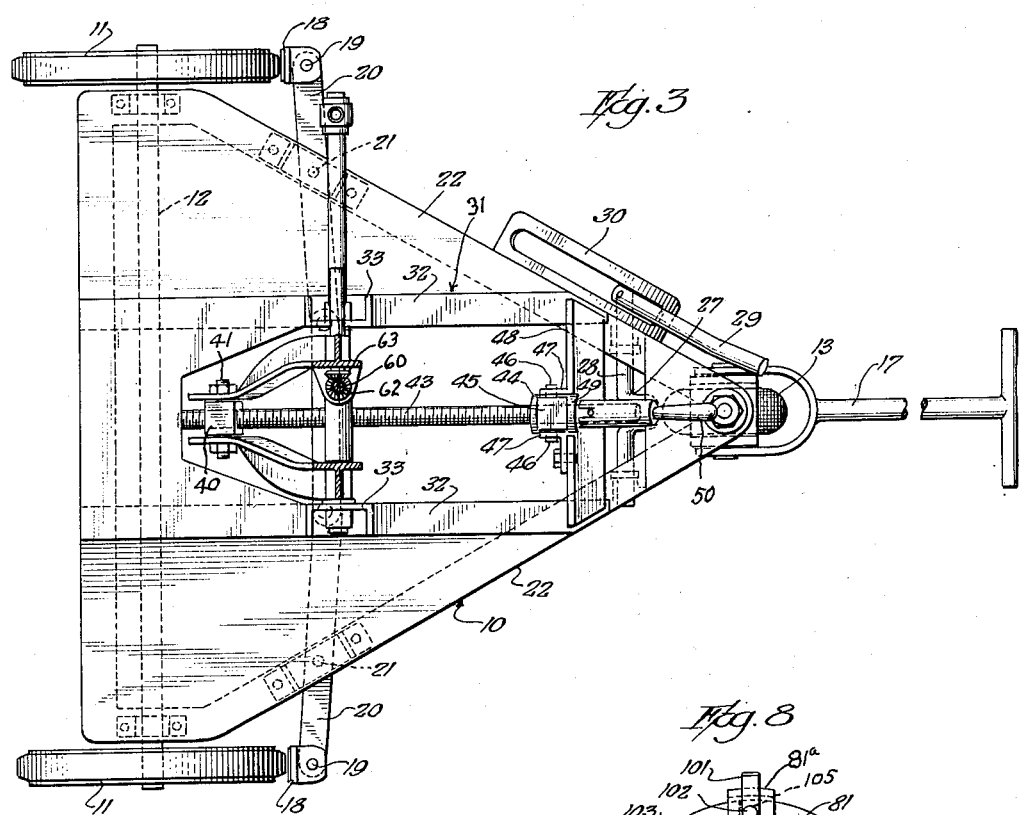
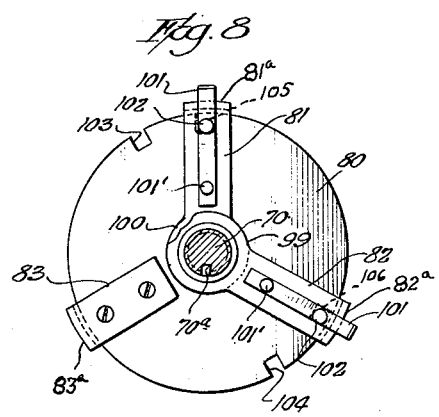
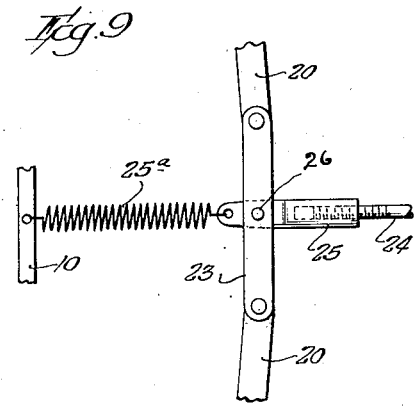
INVENTOR.
Michael Syracusa
BY
Sheridan, Davis & Cargill
Attys.

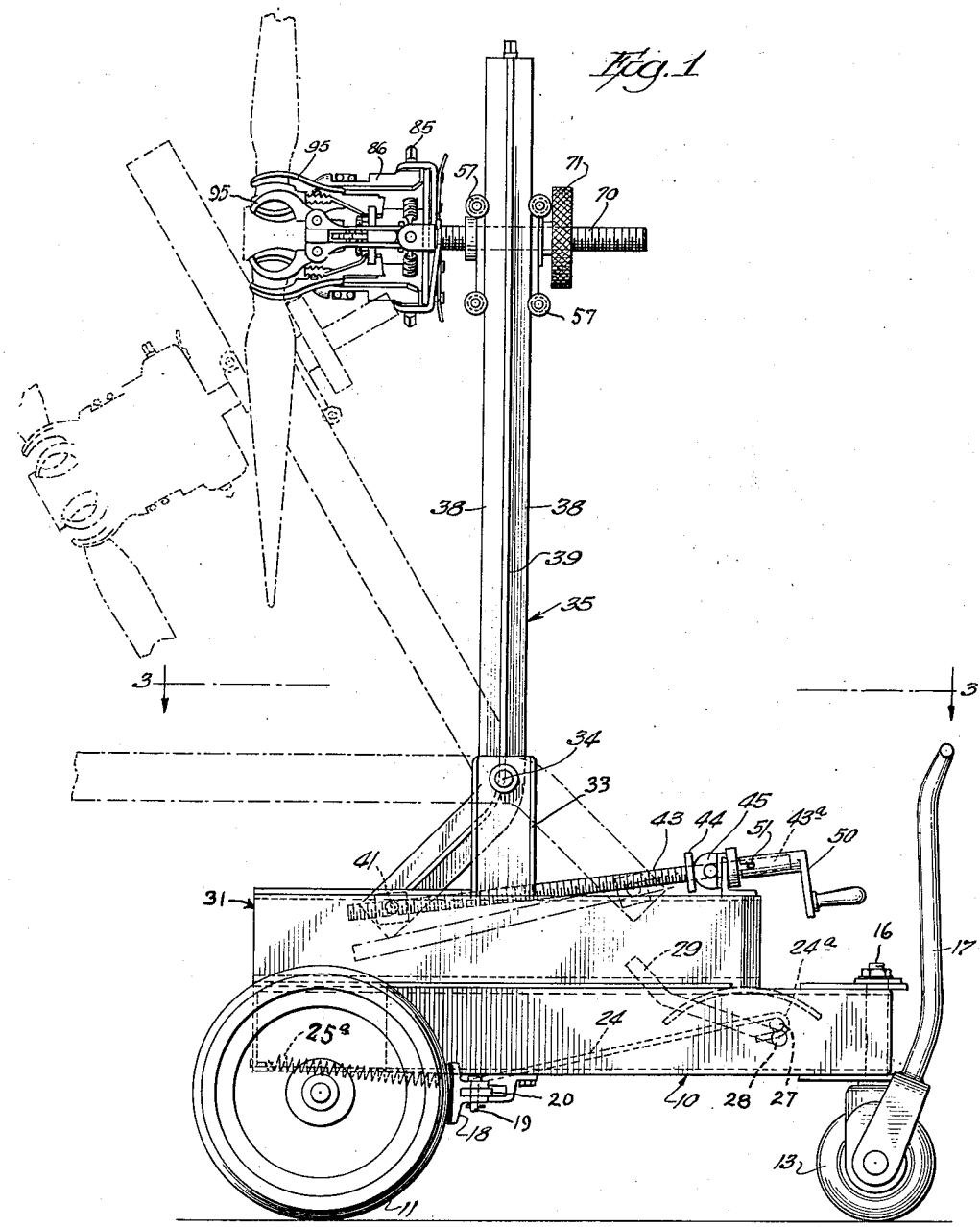

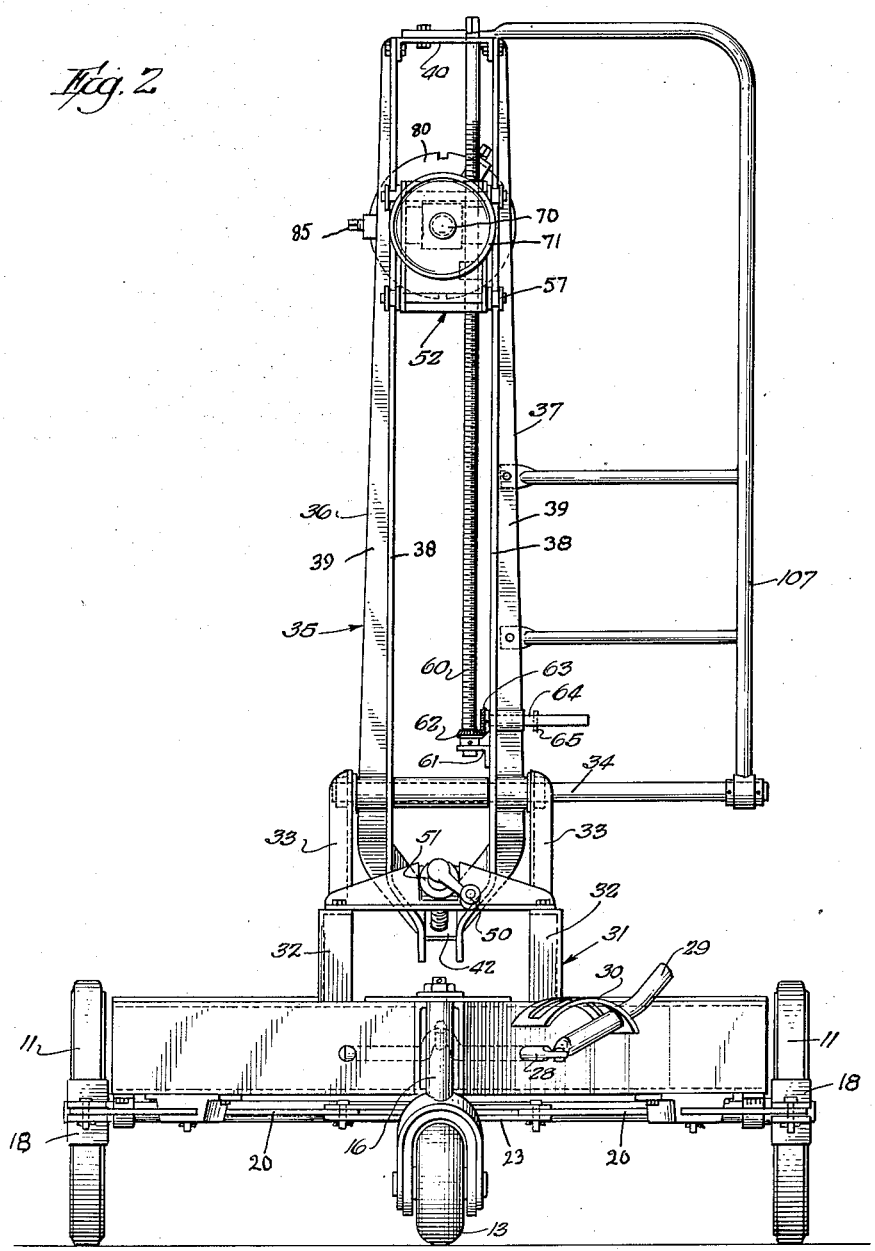

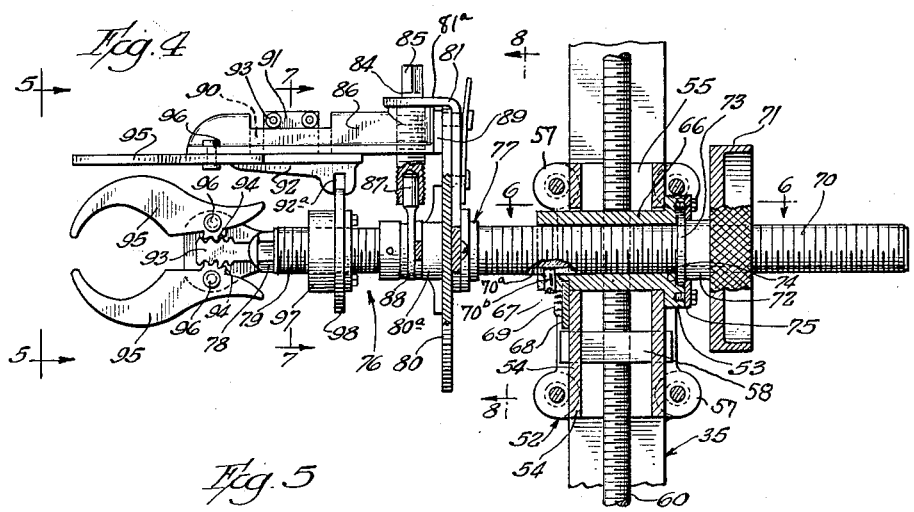

Patented Jan. 2, 1951

2,536,614

UNITED STATES PATENT OFFICE 2,536,614

PROPELLER HANDLING MECHANISM

Michael Syracusa, Chicago, Ill.

Application October 12, 1945, Serial No. 621,983

3 Claims. (Cl. 214—1)

This invention relates to improvements in propeller handling mechanism.

At airports and other landing fields it frequently is necessary to service aircraft such as airplanes including the removal of the propellers of such craft. Large modern aircraft have propellers frequently weighing several hundred pounds and the present improvements relate to structures adapted primarily for handling such propellers including removing them from and replacing them on the propeller shafts and transporting the propellers to and from a work shop or the like where the propellers may be deposited in a desired position for servicing.

One object of the invention is to provide apparatus of the character mentioned which is mobile and is provided with mechanism for gripping propellers in removing them from their respective shafts and in replacing them on the shafts.

A further object of the invention is to provide mechanism including propeller gripping and pulling means which are adjustable for operation along the axes corresponding to the axes of the respective propeller shafts.

A further object of the invention is to provide propeller gripping mechanism that is adjustable for adapting the same for use in conjunction with propellers having two, three, four or even six blades.

Other objects of the invention relate to various features of construction and arrangements of parts which will be apparent from a consideration of the following specifications and accompanying drawings, wherein, Fig. 1 is a side elevation of apparatus which is illustrative of the present improvements.

Fig. 2 is a front elevation of the apparatus.

Fig. 3 is a broken top plan view thereof.

Fig. 4 is an enlarged broken side elevational view of propeller gripping and associated pulling mechanism.

Fig. 5 is a broken elevational view looking in the direction of the arrows 5—5 of Fig. 4.

Fig. 6 is a sectional view taken on line 6—6 of Fig. 4.

Fig. 7 is a broken sectional view taken on line 7—7 of Fig. 4.

Fig. 8 is a sectional view taken on line 8—8 of Fig. 4.

Fig. 9 is a fragmentary top plan view of a portion of the brake mechanism.

In the drawings, the apparatus therein illustrated is provided with a frame, indicated generally by the numeral 10, which, as shown in Fig. 3, is substantially triangular in plan view.

At the rear of the frame, a pair of ground wheels 11 is provided, the wheels being mounted on a transverse shaft 12, carried by the frame 10, while at the forward end of the frame, constituting the apex of the triangle, is mounted a single dirigible wheel 13. The wheel 13 is mounted upon a king bolt 16 suitably secured to the frame. The wheel is provided with a tongue 17, by means of which the apparatus may be hauled and steered. It will be understood that the apparatus shown herein may be motorized if desired, and that the various hand operable mechanisms hereafter described may likewise be power operated. The simplest form of the improvements, however, have been selected for the purpose of illustration and as stated, the tongue 17 is shown as one means for transporting the mobile structure to the place or places desired.

For the purpose of retaining the apparatus stationary at a desired location, brake mechanism is shown comprising a pair of brake shoes 18 each adapted to be pressed into braking contact with the periphery of a wheel 11. The brakes shoes 18 are shown mounted at 19 upon brake levers 20, which are in turn pivotly secured at 21, to the angularly disposed frame members 22, forming the sides of the frame 10. Pivoted to the inner ends of the levers 20 is a beam or link 23, which, when drawn forwardly, or to the right as viewed in Fig. 3, swings the levers 20, upon their pivots 21, in directions to force the shoes 18 into braking contact with the wheels 11. For the purpose of operating the link 23 forwardly to set the brakes a rod 24 is provided. The rod 24 is threadily received within a coupling member 25, which is pivoted at 26 to the beam 23, as shown in Fig. 9. The opposite or forward end of rod 24 is in the form of a hook 24a, which passes around an eccentric or crank arm 27 provided in a brake operating shaft 28 which is journalled adjacent its ends in frames 22. One end of the shaft 28, as shown in Fig. 3, extends through the adjacent frame member 22 and is pivoted to a hand operable lever 29 which is swingable within a slotted guide 30 attached to the frame member. The position of the brake mechanism shown in Figure 1 is such that the brake shoes 18 are out of contact with the wheels 11, but by swinging the lever 29 clockwise, as viewed in said figure, the eccentric will swing the hook 24a of rod 24 clockwise to a past-center position for retaining the brakes in set position against the action of a tensioned spring 25a which upon reverse movement of lever 29 frees the shoes 18 from engagement with the wheels 11. When the brakes are in set position the lever 29 is in a forward position as shown in Fig. 3.

Mounted on the frame 10 is a base or bed indicated generally by the numeral 31 shown as comprising a pair of parallel channel members 32, each of which is provided with a vertical support 33. In the upper ends of supports 33 is mounted a pivot shaft 34 on which is swingably positioned a boom indicated generally by the numeral 35. The boom comprises a pair of spaced members 36—37, each having parallel front edges 38 and an intermediate stiffening rib 39. The upper end of the members 36—37 are connected together by a spacer bar 40, while the lower ends below the axis provided by shaft 34 extend rearwardly and inwardly and are pivotally connected as at 41 to a threaded follower block 42. Extending through the block is a threaded shaft 43 which is of reduced diameter at its forward and at the upper terminal portion of the threads carries a stop ring or collar 44. The unthreaded reduced portion of the shaft passes through a swivelly mounted bearing 45 which is pivotally secured as at 46 to rearwardly turned ears 47 carried by a transverse member 48 secured to the bed members 32 as shown in Fig. 3. Forwardly of the bearing 45 the shaft 43 is provided with a collar 49, secured thereto by any approved means which, in cooperation with the collar 44, restrains axial movement of the shaft within the bearing 45.

The forward end of the shaft 43 is adapted to receive any suitable operating means such as a detachable crank 50 having a recess for receiving the end 43 of the shaft and provided with opposite slots for engaging a cross pin 51 whereby operation of the crank effects rotation of the shaft. By operating the shaft in one direction or the other, the threaded follower 42 is caused to move along the shaft 43 in one direction or the other and thereby swing the boom about the horizontal axis represented by the shaft 34. It will be seen that the boom can be swung, for example, from the vertical full-line position shown in Fig. 1 to the horizontal dotted position, also indicated in said figure.

Slidably mounted on the boom 35 is a carriage indicated generally by the numeral 52. The carriage 52 is provided with a front wall 53 and a rear wall 54 (see Fig. 4) which are retained in spaced relation by intermediate walls 55 and 56 as shown in Fig. 6. Pivotally mounted on front and rear extensions of the walls 54 and 55 are grooved rollers 57 adapted for rolling contact along the front and rear edges 38 of the boom members as indicated in Fig. 6. Extending through the front and rear walls 53 and 54 of the carriage is a member or nut 58, which has an internally threaded aperture 59 through which extends a threaded shaft 60. The upper end of the shaft 60 is journalled in the spacer member 40 and the lower end is journalled in a bracket 61, attached to the boom member 37. The lower portion of the shaft 60 is provided with a bevelled gear 62 with which meshes a pinion 63 which is mounted on a shaft 64. The shaft 64 is provided with a cross pin 65 similar to cross pin 51 of the shaft 43, whereby the same crank 50 may be used on the end of the shaft 64 for rotating the pinion 63 for operating the shaft 60 for causing the carriage 52 to move longitudinally of the boom 35 in either direction.

The carriage 52 is provided with a laterally shiftable unthreaded bushing 66, as shown in Fig. 4 which is supported within aligned slots provided in the front and rear walls 53, 54 of the carriage. The bushing 66 is provided with a transverse groove 67 in the lower wall thereof into which projects a retainer plate 68 which is secured by screws 69 to the wall 54. This arrangement permits the bushing to be shifted laterally within the aperture provided therefor but is restrained from axial displacement.

Supported within the bushing 66 is an externally threaded shaft 70 provided with a hand operable, internally threaded wheel 71. The wheel is provided, in the form shown, with a hub 72 which terminates in an outstanding flange 73, which seats within a rabbet 74, formed in a forward face of the bushing 66. A retainer ring 75 surrounding the hub retains the flange against axial displacement from the rabbet. It will be seen therefore, that by turning the wheel 71, the internal threads thereof cooperate with the threads of shaft 70 for shifting the latter axially in the bushing. The shaft 70 is shown with a key way 70a which receives a key 70b which prevents rotation of the shaft as the handwheel 71 is turned for shifting the shaft axially.

The rear or left-hand portion of the shaft 70, as viewed in Fig. 4, is provided with a propeller gripping mechanism indicated generally by the numeral 76 which is rotatably carried on an unthreaded portion of the shaft extending between a shoulder 77 and an unthreaded nut 78. The propeller gripping mechanism 76 is mounted on a sleeve 79 which is threaded at the left-hand portion as shown in Fig. 4. The propeller gripping mechanism in the form shown comprises a disc 80 having a hub 80a secured to the sleeve 79 and which retains the disc in a plane normal to the axis of the shaft 70. Extending radially of the forward face of the disc 80 there are shown three arms 81, 82 and 83 having horizontally extending arms 81a, 82a, and 83a respectively. Through the apertures of each bracket extends one of three similar studs 84 the outer end portion of each of which is shaped at of 85 for engagement by a socket tool or the like for operating the stud. Inwardly of the respective brackets, each of the studs is threaded and each passes threadedly through one of three radially adjustable supports 86. The end of each of the studs 84 is recessed for receiving a cylindrical bearing member 87 which terminates in a ring or annulus 88 disposed about the unthreaded portion of the sleeve 79. Each support 86 is provided with a stabilizing foot or flange 89 which bears against the adjacent face of the disc 80, whereby when the respective threaded stud 84 is rotated to cause the respective support 86 to be moved axially along the stud or radially of the disc 80, the foot 89 in cooperation with the stud retains the respective support 86 substantially in a position normal to the plane of the disc 80.

Each support 86 is provided with a radially disposed channel, as indicated by the numeral 90. Extending through the channel 90 of each arm is a guide flange 91 formed as a part of slidable gripper or tong operating member 92. Each member 92 is slidable horizontally along the inner face of the respective arm 86 (as viewed in Fig. 4) and is retained in sliding contact with a support 86 by the respective flange 91 which is provided with a pair of transverse studs 91a that bridge the outer open end of the respective channels 90. Each channel 90 is of a length to accommodate movement of the respective flange and gripper operating member 92 a distance sufficient to permit proper opening and closing of the gripping members as hereinafter mentioned.

As shown in Fig. 4 the left hand end of each operating member 92 terminates in a double rack 93, that meshes with teeth 94 provided on tong or gripper members. Members 95 are pivotally secured as at 96 to the respective operating members 92. Shifting the operating members 92 to the right as viewed in Fig. 4 will swing the respective pair of tongs 95 toward closed position while shifting the member 92 to the left as viewed in said figure, will swing the tongs to open position.

Each of the tree arms 92 and the associated mechanism of the head 76 above described are similar, but means are provided for operating the three operating members 92 simultaneously. The means referred to comprises a rotatable hand operable member 97, which is threadily mounted upon the threaded portion of the sleeve 79. The actuating members 92 are provided with slots 92a into which a disc or annular flange 98 extends, whereby when the disc is shifted axially of the threaded sleeve 79 by the operation of the member 97 to which the disc is attached, the members 92 will be moved forwardly or rearwardly, depending upon the direction of operation of the member 97 which shifting of the three members 92 operates the double racks 93 and thus effects the opening or closing of the tongs 95 of each pair.

One of the radially disposed arms such as the arm 83 as shown in Fig. 8 may be secured to the disc member 80 in fixed relation by screws or by welding or other means. The other two members 81 and 82 are provided with rings 99, 100 respectively at their inner ends for mounting upon the unthreaded portion of the sleeve 79 and thus the members 81 and 82 can be swung arcuately about the axis of shaft 70 for adjusting the relative positions of the arms 81, 82.

In Fig. 5 the three members 81, 82 and 83 are shown in full lines spaced 120 degrees apart. In dotted lines the two members 81 and 82 are shown diametrically arranged with reference to the disc 80 and each is disposed at an angle of 90 degrees from the member 83. Adjustment of either member 81 or 82 effects arcuate adjustment of the respective member 86 and the corresponding operating arm 92 and the tongs carried by the latter. Where a three blade propeller or a six blade propeller is to be handled by the apparatus, the members 81 and 82 are adjusted to the position shown in full line in Fig. 5, in which positions each of the three pair of tongs will be in proper relation for grasping one of the blades of a three blade propeller, or for engaging alternate blades of a six blade propeller. Where a two blade or four blade propeller is to be engaged, the members 81 and 82 will be adjusted to the dotted line positions shown in Fig. 5, wherein it will be seen that said two members 81 and 82 being diametrically disposed may be utilized for grasping the two blades of a two blade propeller, or the three members may be used for grasping three blades of a four blade propeller.

Each adjustable member 81 and 82, in the embodiment of the invention shown in the drawing (see Fig. 8) is provided with releasable means for latching the same in adjusted position. In the drawings the latching means shown comprises springs 101 each secured adjacent an inner end by rivets or the like 101' to the right hand face of the respective member as viewed in Fig. 4. Each of the springs carries a stud 102 which extends through an aperture provided therefor in the respective members 81, 82 and is adapted to seat in one of several notches formed in the periphery of the disc 80. By retracting the outer end of the spring 101 to withdraw the respective stud from latching position, the arm 81 or 82 can be swung arcuately to another position and latched in that position by the stud. In Fig. 5 the dotted line position of the members 81, 82 corresponds to the positions wherein the studs 102 seat in notches 103 and 104, thus locking the members 81 and 82 against angular displacement. The full line positions of members 81, 82 in Fig. 5 corresponds to the positions wherein the respective studs 102 seat in notches 105 and 106 which releasably retains said members 81, 82 each in a position 120 degrees from member 83.

In use the tongs 95 preferably are caused to engage the inner end portions of the propeller blades adjacent the hub, and by operating the members 84 by means of a suitable wrench applied to the tangs 85, the members 86 may be adjusted radially with reference to the shaft 70 for positioning the respective tongs for engagement with the propeller blades adjacent the propeller hub. By operating the threaded member 97 the tongs can be opened and closed. Thus, in removing a propeller from a shaft of a plane, the vehicle 10 is moved to a position at the front of the plane with the axis of the shaft 70 disposed as closely as possible in the vertical plane passing through the propeller shaft. By operating the shaft 69 in the proper direction, the carriage can be raised to the proper elevation, and by operating the shaft 43, the boom can be disposed at a proper angle wherein the shaft 70 will form, in effect, an extension of the axis of the propeller shaft. The sleeve 66 as stated above, can be shifted manually in a lateral direction if necessary to enable the operator to effect the disposition of the shaft 70 in the vertical plane of the propeller shaft in the event the vehicle 10 is not in the precise position. When the apparatus has been positioned properly in front of the plane and the head 76 raised to the proper elevation and adjusted to the proper angle, operation of the hand wheel 71 in the proper direction forces the shaft 70 to the left as viewed in Fig. 1, and thus moves the previously opened pairs of tongs into embracing position with respect to the, or some of the, propeller blades. Operation of the member 97 in the proper direction effects closure of the tongs 95 about the respective propeller blades whereupon operation of the member 71 in the reverse direction will shift the shaft 70 and head 76 to the right, as viewed in Fig. 4, and thus withdraw the propeller from its shaft, the propeller securing means having been previously removed.

The mobile apparatus may then be moved to the workshop or other place where the propeller is to be deposited in the event the propeller is to be serviced. Thus, as indicated in Fig. 1 the boom 35 may be operated into a horizontal position for depositing the propeller upon a bench, for example. When so deposited, the member 97 may be operated to open the tongs and thereby release the propeller blades. It will be seen also that a propeller which is to be placed on a propeller shaft may be grasped by the tongs, elevated and transported to the proper position and slid upon the shaft by the use of the apparatus described. In Fig. 1 the boom 35, as shown, is provided with a ladder 107 for the convenient support of operators of the apparatus in actuating the tong operating and adjusting means.

While I have shown and described a structure which is illustrative of the invention, various changes in the details thereof may be resorted to within the scope and spirit of the improvements.

I claim:

1. An airplane propeller handling mechanism comprising a mobile supporting structure, a boom pivotally mounted thereon for movement between a horizontal position and an upright position, a carriage on the boom movable along the same in an axial direction, a reciprocable head on the carriage provided with propeller blade gripping members arranged about the axis thereof and provided with operable means for effecting reciprocating movement of the head in directions normal to the boom whereby with said boom in an elevated position normal to an inclined axis of a propeller shaft of an airplane and located adjacent the end of the propeller shaft said carriage can be moved along the boom into position for axially aligning the head with the propeller shaft whereby said head can be moved toward the propeller for locating said gripping members in position for gripping blades of the propeller, means for actuating said gripping members for causing the same to grip the blades of the propeller on said shaft, means for effecting retraction of the head toward the boom for removing the propeller from the propeller shaft, and means for effecting pivotal movement of the boom whereby a propeller supported by said gripping means following removal from an airplane can be moved by the boom for deposit in a horizontal position.

2. A propeller handling mechanism comprising a mobile support, a boom pivotally mounted on the support for movement between horizontal and upright positions and of a length to project beyond the support when in a horizontal position, a carriage movable along the boom, a reciprocable shaft carried by the carriage at right angles to the boom and projecting beyond opposed sides of the boom in the plane of the pivotal movement of the boom, a head on the shaft at one side of the boom provided with airplane propeller blade gripping members arranged about the axis of the head, means for moving the carriage along the boom for aligning said shaft axially with respect to an inclined airplane propeller shaft when the boom is disposed normal to the propeller shaft, means on the other side of the boom for moving said shaft axially for disposing the gripping members in position for engagement of the propeller blades of the airplane and for retracting the reciprocable shaft for removing the propeller from the propeller shaft, means for operating said gripping members from operative to inoperative position, and means for pivotally swinging said boom whereby with a removed propeller supported by said gripping means the boom can be moved to a horizontal position for depositing the propeller in a horizontal position upon release of the gripping members.

3. A propeller handling mechanism comprising a mobile support, a boom pivotally mounted on said support for movement between a horizontal position and an upright position and of a length to extend beyond a side of the support when in horizontal position, a carriage movable longitudinally of the boom, a reciprocable shaft extending through the carriage in the plane of the pivotal movement of the boom, a head on the shaft at the end thereof that is lowermost when the boom is in a horizontal position, means on the other side of said carriage for reciprocating said shaft, said head being provided with airplane propeller blade gripping means, means for actuating said gripping means to and from gripping relation, means for moving the carriage longitudinally of the boom, and means for moving the boom pivotally on the support whereby a propeller when gripped by said gripping means can be moved from a propeller shaft to a horizontal position of deposit adjacent said side of the mobile support and can be moved from the latter position to a position on a propeller shaft.

MICHAEL SYRACUSA.

REFERENCES CITED

The following references are of record in the file of this patent:

UNITED STATES PATENTS

| Number | Name | Date |
|---|---|---|
| 1,878,994 | Abbe | Sept. 27, 1932 |
| 2,277,828 | Morgan | Mar. 31, 1942 |
| 2,395,411 | Kittel | Feb. 26, 1945 |